(12) United States Patent
Wnek

(10) Patent No.: US 7,764,830 B1
(45) Date of Patent: Jul. 27, 2010

(54) MACHINE LEARNING OF DOCUMENT TEMPLATES FOR DATA EXTRACTION

(75) Inventor: Janusz Wnek, Germantown, MD (US)

(73) Assignee: Science Applications International Corporation, San Diego, CA (US)

( * ) Notice: Subject to any disclaimer, the term of this patent is extended or adjusted under 35 U.S.C. 154(b) by 756 days.

(21) Appl. No.: 11/584,576

(22) Filed: Oct. 23, 2006

Related U.S. Application Data

(62) Division of application No. 09/518,176, filed on Mar. 2, 2000, now Pat. No. 7,149,347.

(51) Int. Cl.
*G06K 9/62* (2006.01)
*G06K 9/32* (2006.01)

(52) U.S. Cl. ...................................... 382/159

(58) Field of Classification Search ......... 382/155–159, 382/305, 209, 217–218, 283, 180, 173, 213, 382/220, 176–177, 181, 224–229, 309; 704/1–10; 715/209–260
See application file for complete search history.

(56) References Cited

U.S. PATENT DOCUMENTS

| | | | |
|---|---|---|---|
| 5,140,650 A | 8/1992 | Casey et al. | 382/61 |
| 5,159,667 A | 10/1992 | Borrey et al. | 715/500 |
| 5,258,855 A | 11/1993 | Lech et al. | 358/462 |
| 5,369,508 A | 11/1994 | Lech et al. | 358/462 |
| 5,369,714 A | 11/1994 | Withgott et al. | 382/177 |
| 5,416,849 A | 5/1995 | Huang | 382/173 |
| 5,625,465 A | 4/1997 | Lech et al. | 358/448 |
| 5,692,073 A | 11/1997 | Cass | 382/219 |
| 5,721,940 A | 2/1998 | Luther et al. | 395/767 |
| 5,748,809 A | 5/1998 | Hirsch | 382/317 |
| 5,768,416 A | 6/1998 | Lech et al. | 382/180 |
| 5,848,186 A | 12/1998 | Wang et al. | 382/176 |
| 5,852,676 A | 12/1998 | Lazar | 382/173 |
| 5,950,196 A | 9/1999 | Pyreddy et al. | 707/5 |
| 5,956,422 A | 9/1999 | Alam | 382/181 |
| 6,006,240 A | 12/1999 | Handley | 715/220 |
| 6,009,196 A | 12/1999 | Mahoney | 382/176 |

(Continued)

OTHER PUBLICATIONS

Wnek, Janusz, "High Performance Inductive Document Classifier," SAIC Science and Technology Trends II, 5 pp., Abstract [retrieved on Oct. 5, 2001], Retrieved from the Internet: http://publications.saic.com/satt.nsf/06.../6cae12cebbf7494f88256665007e88c2?Open Document (1 p.).

(Continued)

*Primary Examiner*—Sherali Ishrat
(74) *Attorney, Agent, or Firm*—King & Spalding LLP

(57) ABSTRACT

The present system can perform machine learning of prototypical descriptions of data elements for extraction from machine-readable documents. Document templates are created from sets of training documents that can be used to extract data from form documents, such as: fill-in forms used for taxes; flex-form documents having many variants, such as bills of lading or insurance notifications; and some context-form documents having a description or graphic indicator in proximity to a data element. In response to training documents, the system performs an inductive reasoning process to generalize a document template so that the location of data elements can be predicted for the training examples. The automatically generated document template can then be used to extract data elements from a wide variety of form documents.

20 Claims, 10 Drawing Sheets

U.S. PATENT DOCUMENTS 6,064,497 A    5/2000   Hannah ..................... 358/486
6,094,505 A    7/2000   Lech et al. ................. 382/180
6,098,034 A *  8/2000   Razin et al. .................... 704/9

OTHER PUBLICATIONS

"Unstructured Document Processing," © 1995-2001 [retrieved on Aug. 29, 2001], Retrieved from the Internet: http://www.miteksys.com/dynafind.html, 2 pages.

"Mitek Announces New Product Strategy Focused on E-Commerce Solutions—New Partnerships and Products Expected to Contribute to Future Revenue," Release Date: Feb. 23, 2000 [retrieved on Mar. 27, 2001], Retrieved from the Internet: http://www.miteksys.com/press49.html, 6 pages.

"How to Automatically Process Unstructured Forms," techinfocenter.com, © 2000, 16 pages.

Hurst, Matthew Francis, "The Interpretation of Tables in Text," PhD Thesis, the University of Edinburgh, 2000, 325 pp.

Lopresti, Daniel and Nagy, George, "A Tabular Survey of Automated Table Processing," in Graphics Recognition: Recent Advances, Springer-Verlag, Berlin, 2000, vol. 1941 of Lecture Notes in Computer Science, pp. 93-120.

"Processing Unstructured Documents," A Technical White Paper, May 6, 1999, 8 pages.

"A Perspective on Document Understanding," A Technical White Paper, Apr. 26, 1999, 7 pages.

Wnek, Janusz, "InTeGen v.1.2: Inductive Template Generator," User's Guide, SAIC CM No. SAIC-99/1346&-InTeGen-UG-01-U-R0C2, SAIC, Vienna, VA, Nov. 24, 1999, 23 pp.

Kieninger, Thomas G., "Table Structure Recognition Based on Robust Block Segmentation," 1998, Proceedings of SPIE, vol. 3305, Document Recognition V, pp. 22-32.

Hori, Osamu and Doermann, David S., "Robust Table-Form Structure Analysis Based on Box-Driven Reasoning," 1995, ICDAR-95 Proceedings, pp. 218-221.

Summers, K., "Near-Wordless Document Structure Classification," in Proc. of the 3rd Int. Conf. On Document Analysis and Recognition, IEEE Computer Society Press, Los Alamitos, CA, 1995.

Esposito, F., Malerba, D., and Semeraro, G., "Multistrategy Learning for Document Recognition," Applied Artificial Intelligence, vol. 8, pp. 33-94, 1994.

Dengel, A., "ANASTASIL: A System for Low-Level and High-Level Geometric Analysis of Printed Documents," in Structured Document Image Analysis, H.S. Baird, H. Bunke, K. Yamamoto (Eds.), Springer-Verlag, Berlin, 1992.

Kopec, et al., "Document Image Decoding Approach to Character Template Estimation," *IEEE* 0-7803-3258, pp. 213-216.

Li, et al., "A Document Classification and Extraction System With Learning Ability," *New Jersey Institute of Technology*, pp. 1-4.

* cited by examiner

| ID NUMBER | NAME AND ADDRESS |
|---|---|
| AL 0-800-920602-9 | Patricia P. Matthews |
| | 643 Saint Paul Ave. |
| | GERMANTOWN  MD 20874 |
| | AMOUNT DUE:    $1,018.00 |

ID NUMBER　　　　　　　　NAME AND ADDRESS

AL 0-800-920602-9

Patricia P. Matthews

643 Saint Paul Ave.

GERMANTOWN　　MD 20874

AMOUNT DUE:　　$1,018.00

*FIG. 4*

| | 0 | 1 | | 2 | 3 | 4 |
|---|---|---|---|---|---|---|
| Line 0 | ID | NUMBER | | NAME | AND | ADDRESS |

| | 5 | 6 | 7 | 8 | 9 |
|---|---|---|---|---|---|
| Line 1 | AL | 0-800-920602-9 | Patricia | P. | Matthews |

| | 10 | 11 | 12 | 13 |
|---|---|---|---|---|
| Line 2 | 643 | Saint | Paul | Ave. |

| | 14 | 15 | 16 |
|---|---|---|---|
| Line 3 | GERMANTOWN | MD | 20874 |

| | 17 | 18 | 19 |
|---|---|---|---|
| Line 4 | AMOUNT | DUE: | $1,018.00 |

*FIG. 5*

```
procedure    GENERALIZETEMPLATE (template, document, DE definitions)
1.  for each data element DE in the document domain do
2.       ← Tde   DE description on the template
         ← Dde   DE description on the training document 3.       if Tde is empty and Dde is not empty then
4.            Copy Dde to Tde
5.            Continue                                              // continue loop starting at 1.

6.       if Tde is not empty and Dde is not empty then
7.            // DE is found both on template and the training page
8.            // Test if DE can be predicted using the current Tde description
9.            if Tde was generalized before then
10.                if DE can be predicted then
11.                     Generalize Position Independent descriptions for ALL alternative rules
12.                     (but not generalize contexts and position dependent information)
13.                     continue                                    // continue loop starting at 1.

14.                if Predicted DE covers more data than Defined DE then
15.                     Generalize Edit Phrase with the Extra Text
                        if DE can be predicted then continue         // continue loop starting at 1.

16.                Restore Previous Edit Phrase                     // because both predictions failed 17.            // Tde is not capable of predicting DE on current document.
18.            // Generalize Tde description and evaluate the description.

19.            for each alternative description Tde_A in Tde description do
20.                     Backup Tde_A
21.                     Generalize Tde_A
22.                     Evaluate description quality of Tde_A 23.                     if Tde_A has sufficient quality then
24.                          if DE can be predicted then break       // break loop starting at 19.
25.                     else
26.                          // Tde_A still cannot predict DE. It may need editing.
27.                          if Predicted DE covers more data than Defined DE then
28.                               Generalize Edit Phrase with the Extra Text
29.                               if DE can be predicted then break  // break loop starting at 19.

30.                     // Tde_A did not pass either the description or performance test.
31.                     Restore Tde_A
32.                     Continue   // until one of the alternative rules successfully generalized 33.            if any of the alternative rules was successfully generalized then
34.                     Increase its generalization counter
35.            else
36.                     Add new alternative description to the current document
```

*FIG. 9*

```
procedure    PREDICT_DE(DEid)
➤ Evaluate and select best alternative description to predict data element
➤ Use the best description to complete prediction process 1.    Tde ← DE description on the template (Deid)
2.    for each alternative description $Tde_A$ in Tde description do
3.        PREDICT_DE_ORIGIN ($Tde_A$)
4.        // DE_Origin[$Tde_A$] and Evaluation[$Tde_A$] are set for this alternative description 5.    while not all alternative descriptions tried do
6.        $Tde_A$ ← Select best alternative description according to the following ordered criteria
7.            // 1. Unique Word Quality Test - number of tests passed
8.            // 2. Search Efficiency - lower number of iterations to find proper search phrase
9.            // 3. Search Output - lower number of candidate words to search
10.           // 4. Search Phrase Quality - higher number of words in search phrase or smaller distance to DE 11.       DE_Size ← PREDICT_DE_SIZE (DE_Original[$Tde_A$])

12.       if DE contents is consistent with $Tde_A$ description then return (DE Origin and Size)
13.       // Otherwise, keep trying the remaining alternative descriptions 14.   return (Prediction failed)
```

*FIG. 10*

```
procedure    PREDICT_DE_ORIGIN (Tde^A)
➢  Use the Tde_A alternative description to find the set of candidate words that originate DE, and set
    DE_Origin[Tde_A]
➢  Collect information on search and description quality, and set Evaluation[Tde_A]

// Search for DE using context phrases located BEFORE the data element
1.   WordBeforeDE ← FIND_CONTEXT_PHRASE_BEFORE_DE
2.   if WordBeforeDE is empty then goto FindAfter
3.   DE_Origin[Tde_A] ← PREDICT_XY (WordBeforeDE)
4.   if DE_Origin[Tde_A] is not empty then goto CollectInfo
5.   OriginB ← Find First Word According To SEQ Data for PhraseBeforeDE // Search for DE using context phrases located AFTER the data element
6.  FindAfter:
7.   WordAfterDE ← FIND_CONTEXT_PHRASE_AFTER_DE
8.   if WordAfterDE is empty then goto FindVertical
9.   DE_Origin[Tde_A] ← PREDICT_XY (WordAfterDE)
10.  if DE_origin[Tde_A] is not empty then goto CollectInfo
11.  OriginA ← Find First Word According To SEQ Data for PhraseAfterDE // Test if a valid range can be constructed based on OriginB and OriginA
12.  if OriginB is empty and OriginA is empty then goto FindVertical
13.  if OriginB is empty then
14.      DE_Origin[Tde_A] ← { OriginA }
15.      goto CollectInfo
16.  if OriginA is empty then
17.      DE_Origin[Tde_A] ← { OriginB }
18.      goto CollectInfo
     // Test if OriginB procedes OriginA (if not then arbitrarily use OriginB)
19.  if OriginB > OriginA then
20.      DE_Origin[Tde_A] ← { OriginB }
21.      goto CollectInfo 22.  DE_Origin[Tde_A] ← { OriginB .. OriginA }
23.  goto CollectInfo // Search for DE using context phrases located directly ABOVE or UNDER the data element
24. FindVertical:
25.     WordVerticalToDE ← FIND_CONTEXT_PHRASE_VERTICALTO_DE
26.     if WordVerticalToDE is empty then return
27.     DE_Origin[Tde_A] ← PREDICT_XY (WordVerticalToDE)
28.     if DE_Origin[Tde_A] is empty then return // Collect Information on the search quality
29. CollectInfo
30.  Evaluation[Tde_A] ← {number of tests passed, number of iterations to find proper search phrase, number of
                         candidate words to search, number of words in search phrase, distance from the first
                         word to DE}
31.  return
```

*FIG. 11* procedure    FIND_CONTEXT_PHRASE_BEFORE_DE( )

> Based on the template description (Template), construct a multi-word context phrase (SearchPhrase) that precisely addresses DE (the phrase has to be located before the first DE word). The phrase has to be close to the DE to assure the most precise reconstruction of DE location. In order to assure that the SearchPhrase is not mismatched on the current document (Document), a unique Landmark in the close proximity to the SearchPhrase is being used. The unique Landmark is a word that was assigned BEST search utility during template learning.
> Find location of the search phrase on the Document.
> From the search phrase, select the word closest to the DE origin.
> Return address of the word location on the Document (DocMatchedWordLocation)

> Procedure FIND_CONTEXT_PHRASE_AFTER_DE is similar to this procedure
> Procedure FIND_CONTEXT_PHRASE_VERTICALTO_DE can be derived from this procedure. The SearchPhrase consists of just one word. It is selected from among words that are directly above or under the first DE word (DE origin). The words for selection are ordered according to the growing variability in the word vertical distances. It means that a word that is always separated by a constant number of lines from DE origin is a preferred choice.

// Set the maximum length of the phrase. The length for not generalized templates is 1.
For generalized templates MAXLENGEN can be set between 2 and 5
1. if DE not generalized then MaxPhraseLen ← 1 else MaxPhraseLen ← MAXLENGEN // Search for a context phrase located BEFORE the data element
2. PhraseNotFound ← TRUE
3. while PhraseNotFound do
4.    SearchPhrase ← Find Next Available Phrase of MaxPhraseLen Consecutive Words Before DE (Template)

// Search for a landmark phrase located close to the search phrase
5.    Landmark ← not empty
6.    LandmarkNotFound ← TRUE
7.    while Landmark not empty and LandmarkNotFound do
8.       Landmark ← Find Next Available Context Word Close to SearchPhrase with BEST utility (Template)
9.       if Landmark is unique on the Document
         then StartPhraseSearch ← Location of the Landmark on the Document
           LandmarkNotFound ← FALSE 10. if LandmarkNotFound then StartPhraseSearch ← beginning of the Document 11. Starting from StartPhraseSearch find location of the SearchPhrase on the Document
12. if SearchPhrase exists on the Document
     then DocMatchedWordLocation ← select from the Document matching phrase the word closest to DE origin
         return (DocMatchedWordLocation)

13. // end of while PhraseNotFound 14. return (PhraseNotFound)

*FIG. 12*

```
procedure    PREDICT_XY ( SearchWord )
Inputs:      Context word (SearchWord)
             DE Template
             Document
Outputs:     A unique DE origin 1. Given the context word (SearchWord) from the Document matching phrase found by any of the
   FIND_CONTEXT_PHRASE_procedures calculate potential DE origin on the current Document.

2. Expand the boundaries around the potential DE origin by a predetermined extent.

3. Identify all words within the expanded boundaries around the potential DE origin.

4. Eliminate all words that do not satisfy DE origin conditions stored in the DE template description.

5. Return a unique word (DE origin) that satisfies conditions in the DE template description.
```

*FIG. 13*

```
procedure    PREDICT_DE_SIZE (DE_Origin)
Inputs:      DE origin
             DE Template
             Document
Outputs:     DE size (width and height)

1. Given the DE is maximal size from the generalized template description maximally expand the bounding box
   from the DE origin.
2. Intersect the bounding box with the actual data from Document and adjust the bounding box to the actual data
   size.
3. If the adjusted bounding box covers any data identified as an Edit Phrase in the template then exclude the
   spurious data characterized in the Edit Phrase and readjust the bounding box to the actual data size.
```

*FIG. 14*

MACHINE LEARNING OF DOCUMENT TEMPLATES FOR DATA EXTRACTION

CROSS REFERENCE TO RELATED APPLICATIONS

The present application is a divisional of, claims priority to and incorporates by reference, in its entirety, U.S. patent application Ser. No. 09/518,176, entitled "MACHINE LEARNING OF DOCUMENT TEMPLATES FOR DATA EXTRACTION," filed Mar. 2, 2000 now U.S. Pat. No. 7,149,347.

The present invention relates to the field of processing machine-readable documents, and in particular to machine learning of prototypical descriptions of data elements for extraction. The document templates (prototypes) are learned and characterized in terms of symbolic descriptors constructed from pattern-forming textual elements.

BACKGROUND

The present invention can be used, for example, to reverse-engineer the process of encoding data in structured documents and to subsequently automate the process of extracting it. We assume a broad category of structured documents for processing that goes far beyond form processing. In fact, the documents may have flexible layouts and may include varying numbers of pages. The data extraction method (DataX™) employs general templates generated by the Inductive Template Generator (InTeGen™). The InTeGen™ method utilizes inductive learning from examples of documents with identified data elements. Both methods achieve high automation with minimal user input.

Historically, document conversion systems have focused on two major types of applications: full-text databases and form processing. Examples of full-text applications include correspondence tracking and litigation support. Major form processing applications include health care forms, tax forms, and the U.S. Census. There is a major class of applications that lies between these two major types. These are called flex-forms. Examples include bills of lading, invoices, insurance notifications and mortgage documentation. Such applications typically are characterized by a large number of document variants. Today, most form processing applications are designed to recognize and capture data from a small number of form types, usually fewer than ten. Even the most versatile operations typically process at most a few dozen forms. The flex-form applications, in contrast, typically involve hundreds to thousands of document variants.

Within a single document domain, there may be many different document types. A document type is a category of documents that reflects a particular activity and shares the same subset of data elements. In each document type, the information may have different layouts, or in other words, each document type may be represented using different document structures. Each document may include one or many pages. Document processing may depend on how single pages are handled. Page factors may affect document assembly after scanning of hardcopy documents, and processing of recurrent (header and footer) information. The page layout of a document may be common for a category of documents, enabling certain types of processing, such as page identification and simple data extraction. Documents consisting of pages with unstable layouts need a different type of processing that depends both on page context and a global document context.

Data extraction from flex-form documents (or even from a broader class of context-based documents defined below) is a challenging problem because of the indefinite structure of such documents. Data fields do not have fixed locations and characteristics on a page, and may flow between pages of documents. Existing data extraction products only partially automate the process and further lack flexibility and robustness.

The complete data extraction process includes two major components: document definition and data element extraction. Document definition involves encoding knowledge about documents and storing it in the form of templates, rules, descriptions, etc. Data element extraction applies that knowledge to retrieve actual data from documents. Existing products only partially automate the data definition process. For example, some products require explicit rule coding for finding data elements. Others, through a graphical user interface, support template design, but all data descriptions have to be detected and input by a user. Overall, application of form processing products to more complex documents may require manual preparation of hundreds of templates or rule sets, which makes them prohibitively expensive due to labor costs. The system described below enables, for example, complete automation of the process of data definition through machine learning.

More specifically, the existing data extraction products, such as FormMapper™ from Teraform™ or InScript™ from Captiva Software Corporation™, only partially automate the process and they lack flexibility and robustness. Teraform™'s FormMapper™ requires explicit rule coding for finding data elements: "Rule Sets contain the instructions which FormMapper™ follows to enhance and zone an input document. They are very similar to directions you might give a friend describing how to get to your house—except in the case of documents, these instructions tell FormMapper™ how to find and zone specific data fields." In a recent patent assigned to Teraform Inc., U.S. Pat. No. 5,852,676 entitled "Method and Apparatus for Locating and Identifying Fields within a Document," a system that tolerates variations in documents is disclosed. The described system, however, falls short in fully automating template generation. One shortcoming of the system is that it requires a substantial user interaction in the process of characterizing fields for extraction (FIG. 4, step 117 of U.S. Pat. No. 5,852,676). The system relies on a human's capability to generalize and predict. Another shortcoming is that the system employs image segmentation processes (FIG. 4, steps 109, 111 of U.S. Pat. No. 5,852,676) that still may require correction by a user's input (FIG. 7A, step 466 of U.S. Pat. No. 5,852,676). The system completely relies on image processing and user input and does not utilize optical character recognition (OCR) data in the process of identifying fields.

Captiva Software Corporation™, created through the merger of FormWare™ Corporation and Wheb Systems™, Inc., is a provider of information capture software. Captiva™'s product, InScript™, through a graphical user interface, supports template design, but all data descriptions have to be discovered and input by a user.

There have been other patents assigned in the field of processing machine-readable forms (forms understood as one-page documents with a static layout). Among other things, however, the methods presented there are not applicable to the broad class of documents considered in this invention. For example, U.S. Pat. No. 5,748,809 entitled "Active Area Identification on a Machine Readable Form Using Form Landmarks" uses graphical landmarks to locate marks (e.g. checkmarks) on forms. Automated detection of landmarks eliminates the need for a user to identify them. In one embodiment, a similar motivation led to the use of context phrases that can be regarded as textual landmarks. Context phrases guide the search for data elements on a document.

While, superficially, landmarks may be used, there are many important differences between landmarks described in U.S. Pat. No. 5,748,809 and, for example, context phrases of the current invention. First, the landmarks are graphical constructs generated using connected component analysis. On the other hand, context phrases include textual constructs resulting from OCR processing. Moreover, since very limited variability between form instances are assumed in the '809 Patent (only distortions introduced by scanners), just one model page is used to generate landmark descriptions. Preferred embodiments of the present invention, however, assume significant variability between the document pages, which is related to the variety of designs of documents that share similar information. Therefore, context phrases are preferably automatically induced from many instances of similar documents. Third, in the '809 Patent, the same set of landmarks is used in identifying all active areas, whereas context phrases of the current invention may be constructed individually to emphasize local characteristics of each data element. A fourth difference is evident in the type and the number of measurements that are taken to address an active area (data element). U.S. Pat. No. 5,748,809 uses absolute position information for both active area and landmark to establish their distance. However, one embodiment of the present invention described below, for example, uses three different distance measures, two of which are not applicable in the context of graphical landmark representation.

Another patent, U.S. Pat. No. 5,721,940 entitled "Form Identification and Processing System Using Hierarchical Form Profiles" describes both form identification and data extraction from forms using the form profiles. The form profile is created from a blank form and is limited to storing descriptions of one-page, static layouts. The method is obviously not applicable to flex-forms and template acquisition from multi-page, filled-out documents.

U.S. Pat. No. 5,416,849 entitled "Data Processing System and Method for Field Extraction of Scanned Images of Document Forms" utilizes a "viewpoint structure" which characterizes data elements and surrounding regions. The viewpoint structure that provides a graphical context ("line ends, box ends, crossed lines, and blobs") for a data element is utilized in filtering out such graphical elements before OCR is done. It is not used in determining the location of a data element. Location of the data element is found in a way typical of form processing, i.e. based on field coordinates and offsets. The only, and distant relation with some embodiments of the current invention is the fact that some kind of context is being stored for use prior to data extraction. Among other things, the method is obviously not applicable to flex-forms.

In a broad sense, preferred embodiments of the present invention are related to the automated discovery of logical structure in text documents. An aim of automated discovery of logical structure may be to create a hierarchy of logical components of a document from given physical instances of the document. Even though this field has been active for over twenty years, none of the existing methods is readily applicable to the subject problem of the current invention. Most of the existing methods target specific types of documents, such as technical papers or office documents. Each approach assumes some prior knowledge of the style of a document. The required information about the document style varies from very specific to general ways of conveying logical information through formatting. Another fundamental distinction in various approaches stems from the relative roles of content and layout in the definition of a logical structure. A first logical structure is more content-oriented than a second logical structure if its definition relies more heavily on internal meaning (wording). A more layout-oriented structure has a definition that relies more heavily on visual presentation. Therefore, in content-oriented methods, OCR data is analyzed and utilized; whereas, in layout-oriented methods, image-processing methods, such as segmentation, projection profiles, and texture analysis, play the major role.

SUMMARY OF THE DISCLOSURE

Data extraction from flex-forms and especially from context-sensitive documents is a difficult problem because of the indefinite structure of such documents. Data fields do not have fixed locations and characteristics on a page, and may flow between pages of documents. These documents are frequently beyond the capabilities of the current set of commercially available form processing systems, which require significant user involvement in the process of defining fields for extraction. The process requires competence and is time consuming. The user has to: (1) learn how to operate a new document processing system; (2) discover patterns in data format and data arrangement; and (3) learn ways of transferring this knowledge to the document processing system. The third requirement may be extremely time consuming and is often frustrating given the system constraints. Moreover, the user's input, calculations, and estimations may often be imprecise and lead to system errors.

Preferred embodiments of the current invention can offer a number of advantages over the prior art. A notable example is that the user can be minimally involved in the process of defining fields for extraction. The user can, for example, only be required to identify what the location of the object of extraction is. The user is not required to provide any additional characterization of the object. All necessary information needed to characterize the object and its context can be acquired automatically. This can minimize both human effort and the likelihood of introducing errors.

A second possible advantage can be achieved from the use of symbolic representation and computation, in particular the use of characters, words, and phrases. In addition to the intuitive nature of the hypothesis that this is the only way to properly reverse engineer document design, the symbolic features and relations provide ultimate capabilities for characterizing document objects. The original characters, their positions, and sizes are supplied by OCR.

A third possible advantage can be achieved via diverse measurements taken to detect invariant field descriptors. Word sequence ordering and word vertical ordering augmented with pixel distances provide powerful means for representing and detecting patterns in document data arrangement. Some patterns that are easily detectable by the system are hard or impossible to discover by a human. Consequently, the system has a much better chance to surpass the performance of traditional methods.

A fourth possible advantage can be achieved via robust generalization of training examples. The example documents can include real documents as opposed to made up document models. This way, the system encounters not only variability in data arrangement, but also possible noise. By processing and filtering out noisy descriptions, the system becomes immune to noise when processing subsequent documents.

A fifth possible advantage can be achieved from utilizing templates, via bootstrapping, in the template definition process. The system supports a user in defining data elements by predicting them based on currently defined templates. This feature greatly speeds up template development, and assures template quality.

A sixth possible advantage stems from the fact that the symbolic descriptive patterns can be language independent. The system may process documents in different languages, both Latin-character-based and other-character-sets-based, e.g. Cyrillic, Greek, Arabic, Japanese, Chinese, etc., as well as hand-written documents in various languages. Moreover, symbols are much more powerful than graphical constructs, such as bounding boxes resulting from connected component analysis. For example, such graphical constructs cannot distinguish between equal size boxes that contain different information.

A seventh possible advantage can be achieved via processing multi-page-structured documents. Data elements may flow between document pages. The documents can be forms, flex-forms, or context-sensitive documents, as defined later in the disclosure.

An eighth possible advantage can be achieved via the system's field editing capabilities. The system is capable of extracting portions of words by automatically trimming learned prefixes or suffixes.

A ninth possible advantage can be achieved via the application of machine learning. Machine learning of data descriptions from examples makes it feasible to include the template generation module in a real-time system, and acquire knowledge about new document cases during production. The input can be directed from key-from-image processing of failed documents. This creates opportunity for the document processing system to become instantly responsive to incoming variations in document designs. This mode of operation is in addition to the common way of template preparation, i.e. in a separate off-line process. The ninth advantage enables new architectures for the data extraction system.

Additional objects, advantages, and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIG. 4 is an example document fragment with a user-defined data element that can be used in one embodiment of the present invention;

FIG. 5 is an example document fragment segmented into lines and words in accordance with an embodiment of the present invention;

FIG. 9 describes a procedure for generalizing templates according to one embodiment of the present invention;

FIG. 10 describes a procedure for predicting data elements according to one embodiment of the present invention;

FIG. 11 describes a procedure for predicting the origin of a data element according to one embodiment of the present invention;

FIG. 12 describes a procedure for finding a context phrase located before a data element according to one embodiment of the present invention;

FIG. 13 describes a procedure for predicting a unique data element origin based on the distance from a context word according to one embodiment of the present invention; and FIG. 14 describes a procedure for predicting the size of a data element according to one embodiment of the present invention.

DETAILED DESCRIPTION OF THE PREFERRED EMBODIMENTS

The preferred embodiments enable one to reverse-engineer the process of encoding data in structured documents and to subsequently automate the process of extracting it. We assume a broad category of structured documents for processing that goes far beyond form processing. In fact, the documents may have flexible layouts and may include multiple pages. The data extraction method (DataX™) employs templates generated by the Inductive Template Generator (InTeGen™). The InTeGen™ method utilizes inductive learning from examples of documents with identified data elements. Both methods achieve high automation with minimal user input.

Reading documents is a relatively easy task for a human reader most of the time. This is due to the fact that the documents are prepared using some common assumptions about structuring documents, and authors intend to convey information in ways allowing readers accurate and efficient interpretation. The problem is, to what degree is it possible to reverse-engineer the process of encoding data in documents and to subsequently automate the process of extracting the data?

We have found that one of the most fundamental functions in the reverse-engineering of the process of encoding data in documents involves optical character recognition (OCR). Since a significant objective for creating most documents is to have them carry textual information, only OCR-based features (characters) make ultimate sense. OCR is the most powerful tool in providing a means to reverse-engineer the document encoding process. Characters, combined in words, sentences, and paragraphs, have been intentionally placed on documents. No other features, such as bounding boxes resulting from connected component analysis, frequency/distribution profiles, texture analysis, or other image processing artifacts, can replicate the utility of text recognition.

Based on recognized character contents and layout, one can build even more meaningful constructs, such as words and phrases, and relate them to each other. We understand that this process is a subsequent, important element in reverse engineering the document encoding process. Words and phrases become elementary symbols in machine document processing. Understanding their relative usage enriches document representation. Now, given the set of symbolic elements related to each other via a set of defined relations, an intelligent system can learn patterns in their arrangement. Generalized pattern descriptions are induced from exemplary definitions of data elements on some instance documents.

Generalization is a powerful knowledge transformation that allows learning of general descriptions that govern data element arrangement. The descriptions of symbol arrangements become the underlying representation for document structures. They disclose intentions of document authors with regard to data composition.

Figure 1:
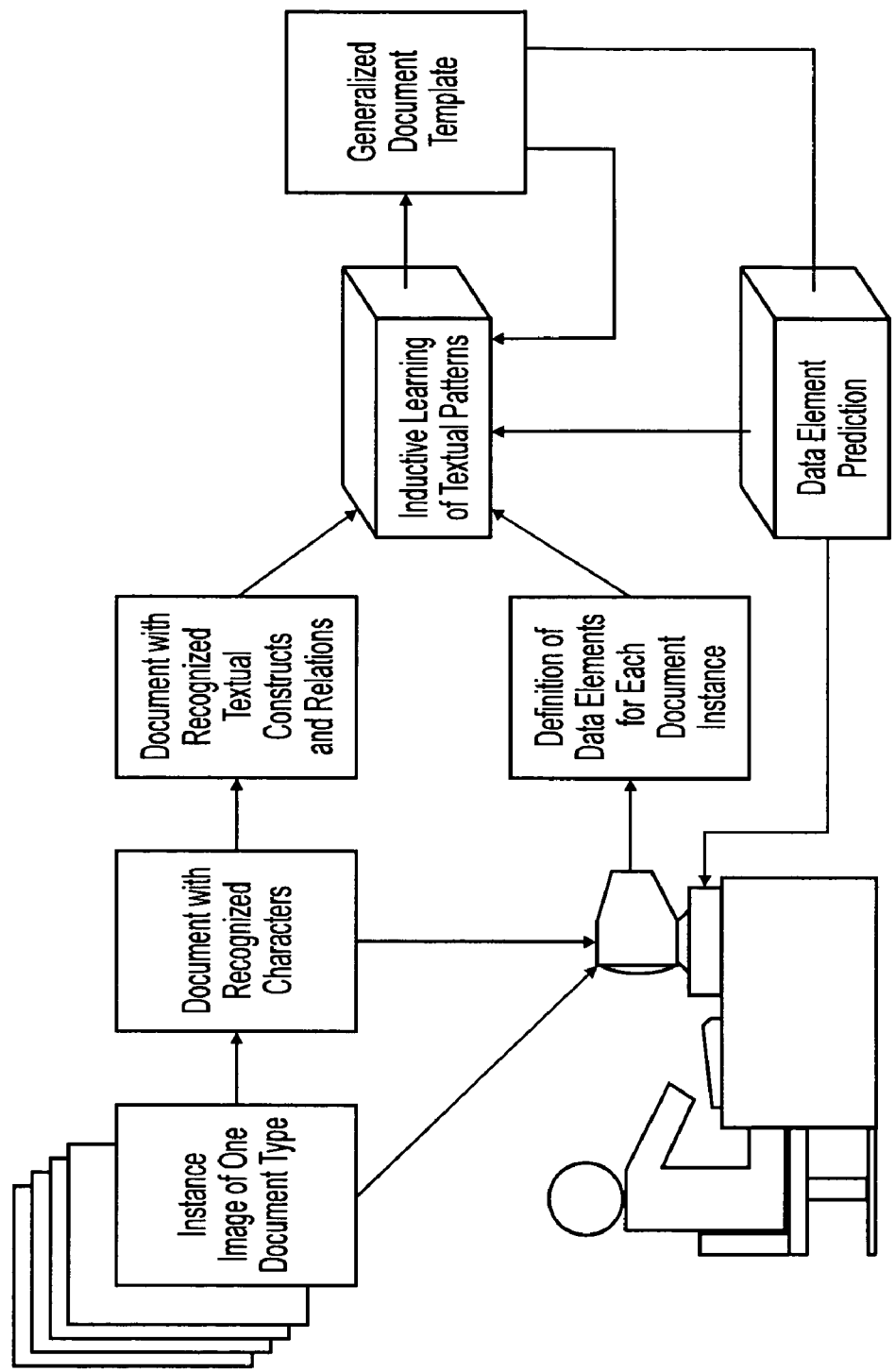
FIG. 1 depicts a system according to an embodiment of the present invention for the machine learning of document templates for data extraction.

FIG. 1 illustrates the process of reverse engineering a document design as specified in the InTeGen™ method. It is assumed that each document file includes ordered images of single pages, assembled in an earlier process. One at a time, a template is learned for each document type. In the first two steps, the document image is extended with a symbolic description of its contents; i.e., with document text and relations between identified textual constructs. Given the document image, a user defines data elements on the image. This procedure involves drawing boundaries around the character strings constituting the data elements.

Data element definitions communicate a user's goals for processing a particular document type at the moment. (Adding more definitions may later augment the goals.) The symbolic representations of the document and data element definitions are input to a learning module. Given the first instance of a document, the symbolic information is simply stored in a document template. Processing the following instances involves assimilation into the template. More specifically, common textual patterns are found in both the new document and the current template, and the general patterns are stored as a new template description.

After each incremental template refinement, the InTeGen™ process is bootstrapped with the newly refined template. The template is utilized in predicting data elements of unprocessed training documents. First, the predicted data elements serve in assisting the user when defining data elements on new documents of the same type. Second, the predicted data elements are utilized in evaluating capabilities of the current template, before the decision about assimilating new documents into the template is made.

The Generalized Document Template represents the original design of one document type with regard to the guidelines provided by the user in the form of data element definitions. Accurate formulation of the hypothesis depends on consistency in the specification of data elements across the document type and the user definitions of data element boundaries.

In summary, in the preferred embodiment of the present invention, one goal is to automatically learn complex document structures, store them in general templates, and utilize them in a data extraction process.

Figures 2, 3:
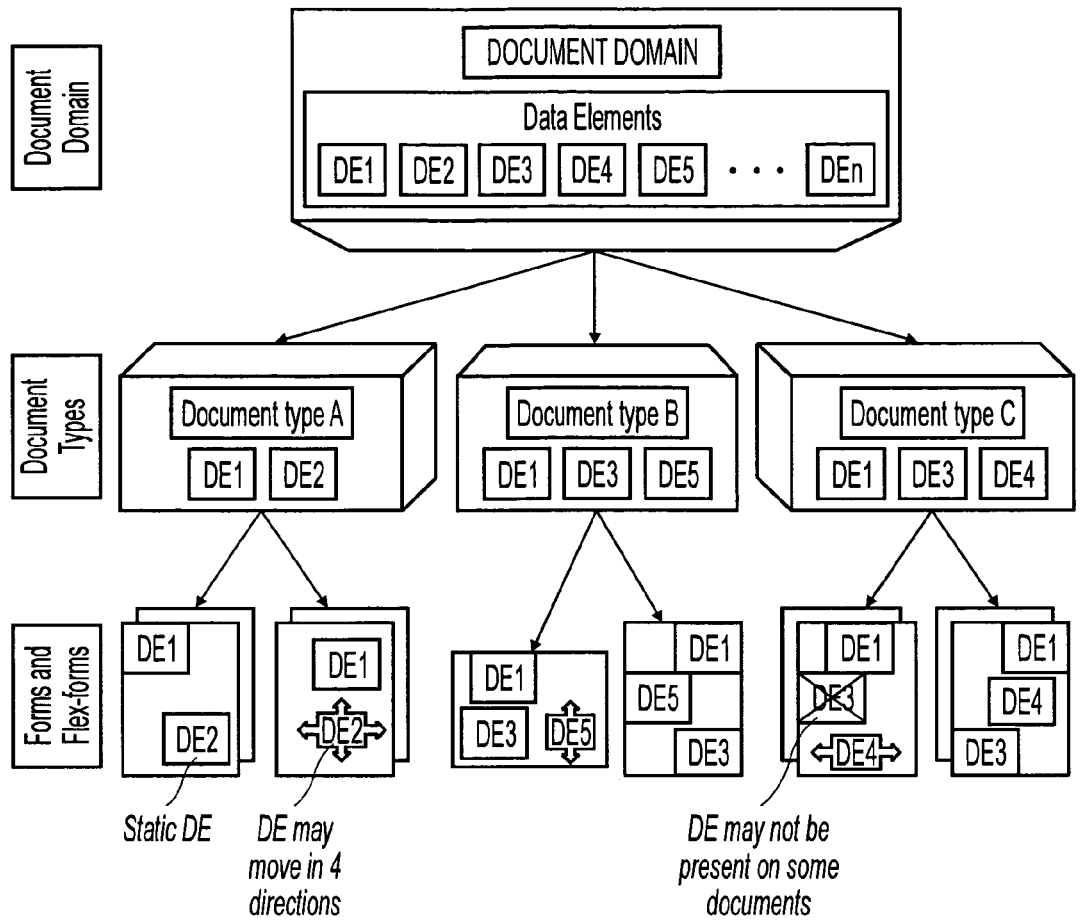
FIG. 2 is a data-driven perspective in accordance with an embodiment of the present invention.
FIG. 3 is an example document fragment that can be used in an embodiment of the present invention.

FIG. 2 illustrates a general view of the invention applicability. In a document domain, e.g. mortgage or insurance documentation, one may identify a finite number of interesting data elements. A data element is a logical unit that defines a textual object for extraction. Textual objects refer to one or more character strings that can be letters, numerical characters, or special characters. We assume that data elements contain one or more lines of textual information and, on a document, can, for example, be enclosed in a rectangular bounding box. The virtual bounding box used within InTeGen™ may or may not have an analog in terms of a printed bounding box on the actual document. The bounding box provides necessary grouping of all words relevant to the data element. Examples of data elements include address blocks, loan numbers, dates, amounts, identifiers, paragraphs of specific descriptions, etc.

In the preferred embodiment, rectangular shaped bounding boxes are used; however, other embodiments use different shapes. One skilled in the art would readily appreciate how to use differently shaped bounding boxes such as circles, multiple rectangles, squares, polygons, triangles, etc. Any shape can be used to identify the location of a data element within a document.

Within a document domain there may be many different document types. A document type is a category of document that reflects a particular activity and shares the same subset of data elements. In each document type the information may have different layouts, or in other words, each document type may be represented using different document structures.

Data extraction from documents may have varied levels of difficulty depending on the structure of the documents. On one end of the spectrum there are forms, where each page has clear, explicit structure defined by static layout of data elements. On the other end of the spectrum, there are documents with no explicit structure. In between, some forms may have less restricted layouts, or some documents may have explicit context that may identify relevant data. In other words, starting with forms that have clear structure defined by layout, by relaxing constraints on positioning data one may continually move to form-free documents.

Each document may include one or many pages. A page is considered a physical unit. Document processing may depend on how single pages are handled. Page factors may affect document assembly after scanning of hardcopy documents, and processing of recurrent (header and footer) information. Page layout, common for the same category of documents, may enable certain types of processing, such as page identification and simple data extraction. Documents consisting of pages with unstable layouts need different types of processing that depend both on page context and a global document context.

Given this perspective, we classify document pages into four categories: forms, flex-forms, context-forms, and free forms. The categories can be arranged in a hierarchy, where each category can be used to describe all the documents that can be described by a less powerful category, as well as some additional documents.

A form is a model of a document page that maintains all characteristics of its layout. Filling in the blanks on a preprinted form or an electronic template creates form-based documents. The form or the template ensures that the data is filled in within the same area on a page. Knowing the type of a form or template used, a data extraction system has a relatively easy task to do, i.e. extract data from the same location on a page.

A flex-form is a model of a document page that maintains some characteristics of its layout. In general, flex-forms are created by relaxing form layout by reserving larger areas for specifying data elements on preprinted forms to enter additional descriptions, or an electronic template may allow moving the succeeding data fields, if more space is needed for the given field or section. This makes the position of data elements less predictable. In the same fashion, the layout of the document is not completely repetitive any more.

A context-sensitive (context-related, context-form) document is a model of a document in which each data element has an identifiable context associated. The context may include a description or graphics in fixed proximity to the data element. The data element and the related context may be located in varying places on pages of the same document type. However, the relative position of the data element to its context cannot change dramatically. Useful context may also be provided in relation to physical location on a page.

A free form document is the broadest classification of documents. Data extraction from a free form document that is not one of the form-based, flex-form based, or context-form based documents, may require advanced natural language processing.

In order to facilitate processing of context-sensitive documents, a document template is introduced to represent a generalized document description. The document template captures characteristics of the complete document as opposed to page (or form) templates that generalize single pages only. It is sometimes possible to represent a multi-page document as a set of page templates provided that these pages are independent of each other. On one hand, this may be a feasible solution, especially when the available processing system is based on page templates. However, it may also lead to unnecessary redundancy in the electronic document management system (EDMS).

A document template contains generalized descriptions of data elements. A data element is a logical unit that defines an object for extraction. We assume that data elements contain one or more lines of textual information and can be enclosed in a rectangular bounding box. The bounding box provides necessary grouping of all words relevant to the data element.

This disclosure describes, for example, a method for data element extraction from loosely structured documents. The method inductively learns a document template from examples of known documents and then applies the template to extract data elements from any document that matches the same template. The template includes descriptions of data elements identified for the given document type. Defining a data element is a very simple operation. A user simply has to draw a bounding box around the data element and select a predefined name for that data element (FIGS. 3 & 4). The data element description and necessary context is both acquired from the document and maintained automatically. Keywords, key phrases, or the layout of a data element on a page can provide the context. This ensures that forms, flex-forms, and context-form documents can be processed using the same general tool.

Data extraction from new documents, not used in training, is based on the application of the template. The context enables finding the data element on the document and helps in determining the scope of the data element.

The below description of a preferred embodiment of the present invention includes two major parts: description of data structures and algorithms.

In the template generation process, a document is described at several levels of abstraction: page, line, word, character, and data element levels. A word is any string delimited by whitespace. A character is any single symbol recognized by OCR. A data element is a rectangular block of text selected and named by a user.

The page level includes descriptions of all pages included in the document. These are simply page dimensions and margin offsets. One paper sheet includes two pages.

The line level includes the total number of document lines, vertical offsets to line bases from the beginning of the document, and numbers of words in each line. An OCR engine predetermines division of a document into lines.

The word level includes the total number of document words, horizontal offsets to words' start and end as measured from the line beginning, and number of characters in each word.

The character level includes the total number of document characters, horizontal offsets to characters, their widths and heights, as well as the complete document text. The text includes words separated by single spaces; multiple spaces are compressed.

The data element level includes a list of data element descriptions as discussed below.

A template represents a generalized document description. It shares a document's data structure but only the data element level is used to represent generalized information. The remaining levels provide an example of a document description.

A data element (DE) is a logical section of a document subject to extraction. In a template, each data element is represented by a list of alternative descriptions. Alternative descriptions represent various patterns in DE contexts that are significantly different. For example, if documents from the same class use different captions to tag the same data element then the system may use two or more alternative descriptions to represent the changing captions.

A single description contains four attribute types: physical, lexical, contextual, and control type.

Physical attributes include ranges of vertical and horizontal positions in the document, width range, height range, and maximal width and height including whitespace available. Positions, widths, and heights are measured in pixels. Other physical attributes include number of lines (range), word position in the line from both left and right (ranges), number of words in the line (range), and number of characters in the first word (range).

Lexical attributes correspond to document description at the three levels: line level, word level and character level. The line level includes the total number of DE lines; vertical offsets to line bases from the beginning of each DE, and numbers of words in each DE line. The word level includes the total number of DE words, horizontal offsets to words' start and end from DE line beginning, and number of characters in each word. The character level includes the total number of DE characters, horizontal offsets to characters, their widths and heights, as well as the complete DE text. The text includes words separated by single spaces, multiple spaces are compressed. Lexical description provides an example of data element contents. It does not contain any generalized information.

Figure 6:
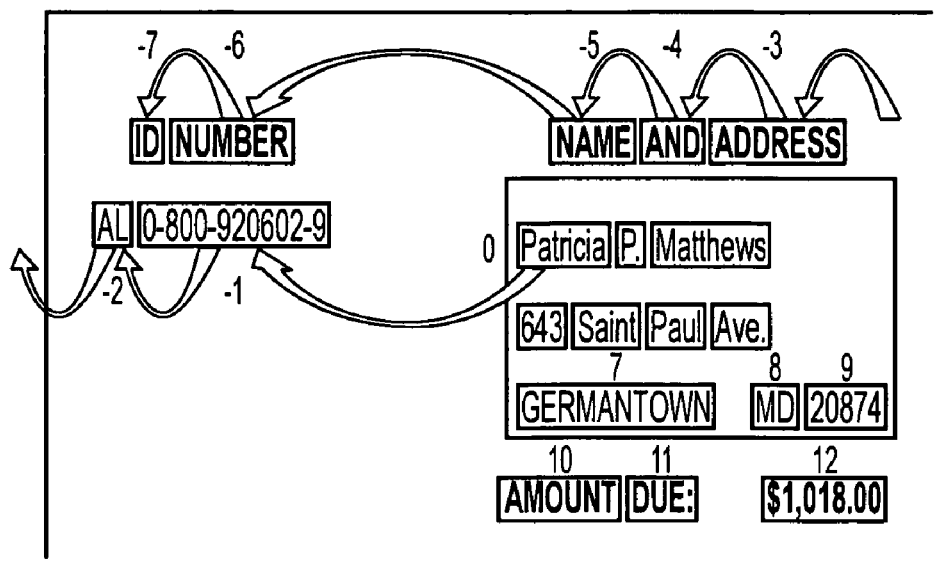
FIG. 6 describes the use of word sequence distances according to one embodiment of the present invention.
Figure 7:
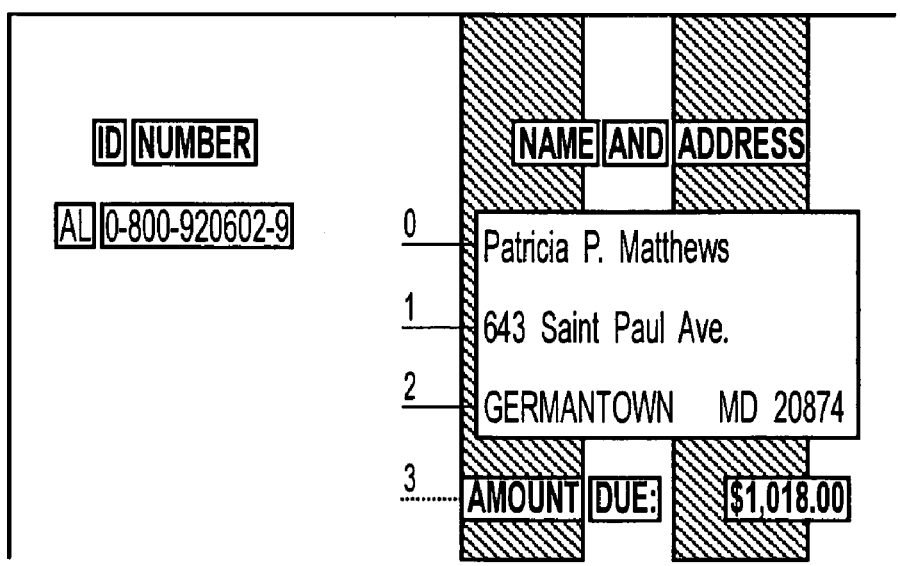
FIG. 7 describes the use of word vertical distances in accordance with one embodiment of the present invention.
Figure 8:
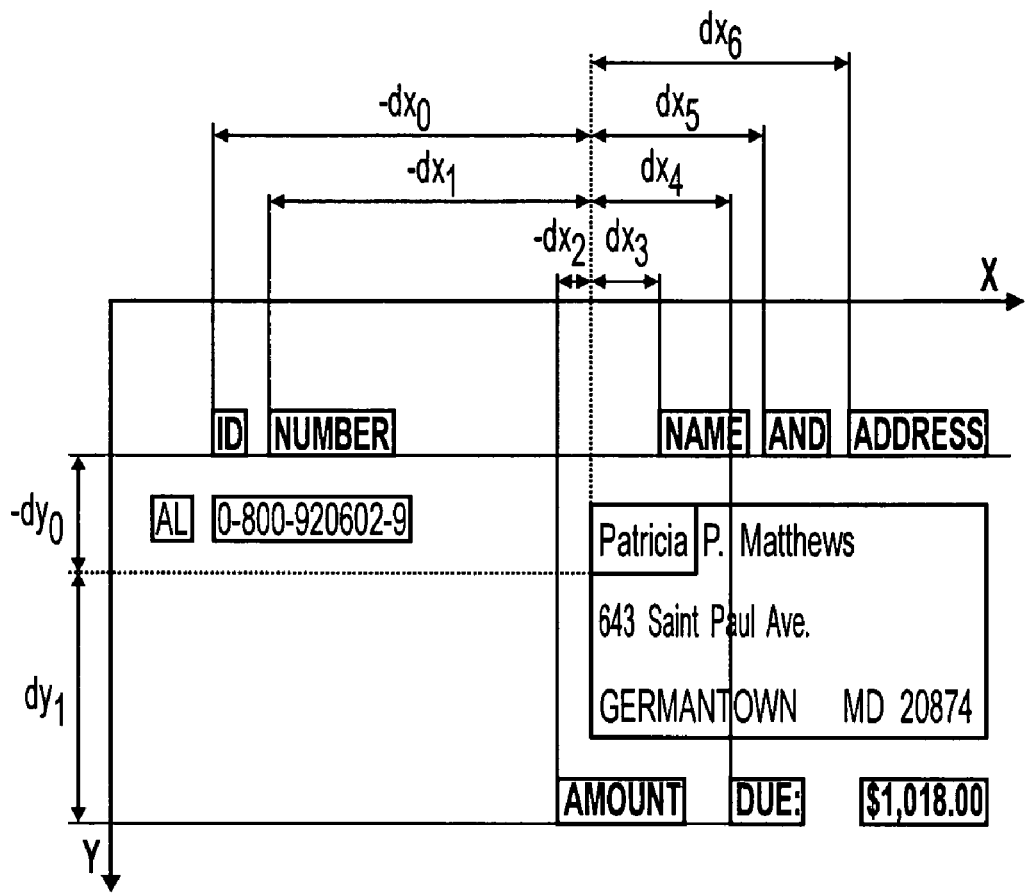
FIG. 8 describes the use of pixel distances from document words according to one embodiment of the present invention.

Contextual attributes include number of words in the context, and actual words with distance and utility measurements. The words are naturally ordered in a sequence according to the line order produced by an OCR and read from left to right. The distances are grouped into two categories: pixel and word distances (FIGS. 5-8). Pixel distance describes span (in pixels) between the context word and the DE origin, i.e. the beginning of the first DE word (FIG. 8). Two ranges in vertical (x) and horizontal (y) dimensions represent the pixel distance. Word distances are stated using the number of words between the context word and the first DE word. Two word distances are used: sequential and vertical. Sequential word distance counts words as they were read line by line, from left to right (FIG. 6). Vertical word distance counts the number of lines containing words intersecting the column delineated by the width of the context word (FIG. 7). For each vertical distance, the number of occurrences (frequency) in various documents is collected.

The distances are whole numbers. Positive numbers indicate that the context word is after the first DE word. Negative number indicates that the context word is before the first DE word. The order depends on the type of distance. For pixel distances, "before" means that the context word is above in the vertical dimension and to the left in the horizontal dimension. For sequential word distance, "before" means that the context word is closer to the beginning of the document than the DE word. For vertical word distance, "before" means that the context word is above the DE.

The utility of a context word indicates the usefulness of the word for searching purposes. Four values are being assigned: best, good, fair, and poor. Best utility is assigned to words that precisely identify a DE by themselves and are unique. Good utility is assigned to words that precisely identify a DE (in terms of the search method, e.g. starting from the top of the document) but are not unique. Fair utility is assigned to unique words that occasionally may fail the search. Poor utility is assigned to words that should not be used in searches.

TABLE 1

Context word utility with regard to potential search precision and uniqueness within the document.

| Utility | Search Precision | Uniqueness |
|---------|------------------|------------|
| Best    | +                | +          |
| Good    | +                | −          |
| Fair    | −                | +          |
| Poor    | −                | −          |

Control attributes include word types for selected DE words (e.g. first words in each DE line), indices of the first DE line, word, and character; a generalization counter, and the DE identifier in the domain. Word types categorize words into several classes, such as: numeric with various combinations of related characters (e.g., +, #, %, etc.), alphabetic (ALL CAPS, all lower case, mixed, etc.), alphanumeric, dates, etc. Generalized word types may have one or more values.

A template for a given document class is built in an incremental way from examples of documents (training documents) and data element definitions. The documents are first assembled from scanned and OCRed pages, and stored in the document description data structure. For each document, a user defines a set of data elements. Data element definitions are as simple as the process of defining them, i.e. drawing bounding boxes around them. DE definitions include five numbers: vertical (x) and horizontal (y) position of the bounding box origin, width (w), height (h), and data element identifier. Each document description is stored in a file. File contents do not change unless the document is rescanned or re-OCRed. The set of data element definitions is stored in a separate file. Adding, removing or changing data element definitions modifies that file.

The GENERALIZETEMPLATE procedure details the top-level operations utilized in the learning process (FIG. 9). It iterates through the list of data element definitions and generalizes each data element description. Generalization of DE descriptions is performed independently of each other.

Given the first training document and a set of data element definitions, InTeGen™ initializes the template by copying the document description to the template description, and by constructing and attaching initial data element descriptors to the template for each data element. Each data element descriptor is constructed based on its definition and document contents. Filling out a data element descriptor involves extraction of relevant lexical descriptors from the document description, determining values of physical and control attributes, and constructing contextual attributes. Initially, contextual attributes comprise all document words. For each attribute, all types of distance measurements are taken, i.e. pixel distance, sequential and vertical word distances. Copying the document description to the template is simple because both document and template descriptions share the same data structure.

Given the second training document and the set of DE definitions, generalization of the template occurs unconditionally. The following training documents may or may not be generalized with the template depending on template generality, or in other words, the template's capability of correctly predicting the place and scope of its data elements. Template generalization equates to generalization of any of the DE descriptions. In order to determine if a template covers DE descriptions from the training document, a prediction test is conducted for each DE. The template's DE description is generalized only if it is not capable of correctly predicting the given DE on the training document.

DE description generalization involves generalization of particular attributes. For physical and control attributes expanding the range of measured values is sufficient. The selection of this type of generalization was dictated by the nature of document attributes, values of which are analog (continuous) rather than digital (discrete). For example, assuming that DE sequential word distances for the first two documents were 5 and 8, the generalized distance results in a range between 5 and 8. This means that if the third document distance value is 7 then the third document is already covered by that condition.

Generalization of context attributes involves intersecting two sequences of words and then, for the common words, generalizing their values. For example, given the two sequences of words, T_CAi, D_CAi, below, describing the contextual attribute (CA) of data element (i) on template (T) and document (D), their generalization results in T_CAi. Spacing between words was added to emphasize the method of aligning words.

TABLE 2

Generalization of two sequences.

| T_CAi: | word1 |       | word2 | word3 | word4 | word5 | word6 |       | word7 | word8 |
|--------|-------|-------|-------|-------|-------|-------|-------|-------|-------|-------|
| D_CAi: | word1 | word8 | word2 |       | word4 |       | word6 | word3 | word7 | word8 |
| T_CAi: | word1 |   | word2 |   | word4 |   | word6 |   | word7 | word8 |

The method for aligning words incorporates three general preference criteria for selecting words for alignment. Additional criteria may be added based on document characteristics in a particular document domain. The general preference criteria include:

1. Words in the template are more significant than those in the document (unless the template was not generalized yet).

2. Alignment should maximize the number of common words.

3. Alignment should take into consideration keywords or key phrases delimiting identifiable sections of a document.

After DE generalization, the DE description is evaluated with regard to its utility. There are two criteria for testing DE description utility. The first is based on description evaluation, and the second is based on performance evaluation. If both tests are passed then the DE description replaces the previous one in the generalized template. If any of the tests fail, then a new alternative description is created.

Description evaluation involves determining the amount of change in context close to the DE. The change is determined by comparing sequence word distances in the last two generalizations. If the distance to the word immediately preceding the DE increased by more than MAX_INCR_BEFOR, or the distance to the word immediately following the DE increased by more than MAX_INCR_AFTER, then a new alternative rule is added. MAX_INCR values can be determined empirically for the given document-processing domain.

Performance evaluation involves testing prediction capability using the recently generalized DE description. The document that was recently used for generalization serves as a testing material. The document description is given to the prediction module and the result is compared with the data element definition. This procedure allows for producing consistent and complete descriptions with regard to the training set of documents.

In some cases, a data element may show a high degree of variability in addition to not having precisely defined boundaries. For example, a data element may include a varied number of lines with some other data immediately following it. The attached data may easily be construed as an integral part of the data element especially when it takes place optionally. In another case, the first word of a data element may have a prefix or a suffix. In order to detect ambiguous boundaries, InTeGen™ learns the structure of edit phrases (explained below) that delimit a data element.

The GENERALIZETEMPLATE procedure takes advantage of failing prediction tests to learn about edit phrases. Edit phrases include the difference between the predicted text and the defined text. The phrases are generalized, stored and utilized when predicting data elements. The edit phrase data structure includes a location attribute (prefix or suffix in line number, before DE, after DE), the generalized text of the phrase, and a generalization counter. The generalized text of the edit phrase stores actual words if they reappear, or word types for varied phrase words.

The generalization procedure takes two phrases and outputs a general one. If the two input phrases have the same length and the respective words are of the same type then the resulting phrase includes a sequence of generalized words. Otherwise, both phrases are added to the list of edit phrases. The word generalization procedure takes two words and outputs a single general word. If the two input words are equal, then the word is used as the general one. If they differ, then generalization includes the common word type, e.g. number, all caps word.

Prediction plays an important role in building a generalized template. Given the fact that during template generation data element definitions are available from a user as an integral part of the training set, DE definitions may also serve as a basis for comparison with predicted values. Feedback produced that way is useful in an automated system. It provides a means for detecting the need for performing generalization, and once generalization is done, it can verify a template's utility. As a result of such verification, it may lead to follow-up actions such as building alternative descriptions.

Given a data element identifier (id), the PREDICT_DE procedure (FIG. 10) selects the DE description from the template (line 1). A DE description is by itself disjunctive. It includes alternative descriptions covering variations in the DE context observed on different training documents. The procedure has to decide which alternative description is best for making a prediction on the given document. In order to do this, it performs partial prediction based on all of the alternative descriptions (lines 2-4) and then selects one to complete the prediction process (lines 5-13). In the case where no alternative description can be successfully applied, PREDICT_DE reports failure (line 14).

The prediction process breaks down into two stages: finding the origin of the data element on the current document (line 3) and determining the size of the data element (line 11). Finding the DE origin is simplified to finding the first word of the data element, which is facilitated by the DE description constructed in the learning phase (FIG. 11). This task involves selecting the proper search phrase to address the first word, applying one of the distances to find candidate words, and determining the best candidate based on testing the first word properties. Once the first word is known, the origin of the DE bounding box is also known. Determining the DE size (width and height of the bounding box) is based again on measurements and characteristics gathered during the learning phase and stored in the DE description (FIG. 14).

The PREDICT_DE procedure assumes exhaustive evaluation of all alternative rules (line 2). This is done under the assumption that the generalization module is capable of maintaining a relatively small number (up to a few tens) of alternative descriptions. If this is not feasible, then the PREDICT_DE procedure needs to modify the selection of the best alternative description. The determination could be cut short based on application of the selection criteria within the "for" loop. For example, if the application of the given description identifies a unique word that satisfies most of the quality tests, then it could be applied to finalize the prediction process.

Finding the DE origin is outlined in the PREDICT_DE_ORIGIN procedure (FIG. 11). It includes five blocks of code. The first block (lines 1-5), searches for the DE using context phrases located before the data element. The second block (lines 6-11), searches for the DE using context phrases located after the data element (FIG. 12). If one of the searches succeeds in finding a reliable phrase that is located in consistent pixel proximity from the data element that yields the anticipated DE origin (as tested in PREDICT_XY, FIG. 13), information on the search quality is collected (in the $5^{th}$ block, lines 29-31), and control is returned to the calling procedure. If the two searches do not yield an anticipated DE origin, a range of words for examination is constructed ($3^{rd}$ block, lines 12-23), and the DE origin is decided based on sequential location in the target document and data type of the DE first word. If there is no valid context phrase before or after the DE, or it is not possible to predict using the sequence distance, context phrases above and under are examined, and the vertical distance may be applied to predict the DE origin ($4^{th}$ block, lines 24-28).

Three similar procedures are employed to search for context phrases: FIND_CONTEXT_PHRASE_BEFORE_DE, FIND_CONTEXT_PHRASE_AFTER_DE, and FIND_CONTEXT_PHRASE_VERTICALTO_DE ("vertical" search includes context phrases above and below the DE). Based on the template description, they construct a multi-word context phrase (SearchPhrase) that precisely addresses the DE. The phrase has to be close to the DE to assure the most precise reconstruction of the DE location. In order to assure that the SearchPhrase is not mismatched on the currently processed document, a unique Landmark in close proximity to the SearchPhrase is being used. The unique Landmark is a word that was assigned BEST search utility during template learning. The procedures return the address of the word nearest to the DE origin.

While preferred embodiments of the present invention have now been described, it should be appreciated that these examples are merely illustrative of the invention. Many variations and modifications will be apparent to those of ordinary skill in the art.

What is claimed is:

1. A method for predicting the placement of a data element within a document, comprising:

using a computer to perform the following steps:

finding an origin of a data element within a document using a data element description;
determining the size of the data element; and
editing the data element.

2. The method of claim 1, wherein editing the data element includes removing a prefix or a suffix.

3. The method of claim 1, wherein the data element description includes rules for normalizing data elements and editing the found data element includes normalizing the found data element as specified by the data element description.

4. The method of claim 1, wherein finding an origin of a data element includes searching for a context phrase that would appear before a data element or after a data element.

5. The method of claim 1, wherein finding an origin of a data element includes: searching for a context phrase that would appear vertically before or after a data element.

6. The method of claim 1, wherein finding an origin of a data element includes:
    searching for a context phrase that would appear before a data element;
    searching for a context phrase that would appear after a data element; and
    searching for a context phrase that would appear vertically before or after a data element.

7. The method of claim 1, wherein the data element description includes one or more alternative data element descriptions.

8. The method of claim 7, wherein finding an origin of a data element includes finding an origin of a data element for each of the one or more alternative data element descriptions.

9. The method of claim 8, wherein finding an origin of a data element further includes selecting the best of the one or more alternative data element descriptions.

10. A computer system for predicting the placement of a data element within a document, comprising:
    means for finding an origin of a data element within a document using a data element description;
    means for determining the size of the data element; and
    means for editing the data element.

11. The computer system of claim 10, wherein the means for editing the data element includes means for removing a prefix or a suffix.

12. The computer system of claim 10, wherein the data element description includes rules for normalizing data elements and the means for editing the found data element includes means for normalizing the found data element as specified by the data element description.

13. The computer system of claim 10, wherein the means for finding an origin of a data element includes means for searching for a context phrase that would appear before a data element or after a data element.

14. The computer system of claim 10, wherein the means for finding an origin of a data element includes means for searching for a context phrase that would appear vertically before or after a data element.

15. The computer system of claim 10, wherein the means for finding an origin of a data element includes means for:
    searching for a context phrase that would appear before a data element;
    searching for a context phrase that would appear after a data element; and
    searching for a context phrase that would appear vertically before or after a data element.

16. The computer system of claim 10, wherein the data element description includes one or more alternative data element descriptions.

17. The computer system of claim 16, wherein the means for finding an origin of a data element includes means for finding an origin of a data element for each of the one or more alternative data element descriptions.

18. The computer systems of claim 17, wherein the means for finding an origin of a data element further includes means for selecting the best of the one or more alternative data element descriptions.

19. A system for predicting the placement of a data element within a document, comprising:
    an optical character recognition module receiving an image representative of a document, the optical character recognition module creating a textual-based representation of a document from a graphical-based representation of a document;
    a document template associated with the document type for extracting data from documents of the document type;
    an inductive template generator generalizing the document template based on one or more training documents utilizing machine learning; and
    a data extraction component utilizing the document template for finding an origin of a data element within a document using a data element description, determining the size of the data element; and editing the data element.

20. The system of claim 19, wherein editing the data element includes removing a prefix or a suffix.

\* \* \* \* \*